United States Patent
Takikawa et al.

(10) Patent No.: US 10,443,679 B2
(45) Date of Patent: Oct. 15, 2019

(54) DAMPER DEVICE

(71) Applicant: AISIN AW CO., LTD., Anjo-shi, Aichi-ken (JP)

(72) Inventors: Yoshihiro Takikawa, Tsushima (JP); Hiroki Nagai, Anjo (JP); Takao Sakamoto, Anjo (JP); Kazuhiro Itou, Anjo (JP)

(73) Assignee: AISIN AW CO., LTD., Anjo (JP)

( * ) Notice: Subject to any disclaimer, the term of this patent is extended or adjusted under 35 U.S.C. 154(b) by 225 days.

(21) Appl. No.: 15/327,558

(22) PCT Filed: Aug. 20, 2015

(86) PCT No.: PCT/JP2015/073329
§ 371 (c)(1),
(2) Date: Jan. 19, 2017

(87) PCT Pub. No.: WO2016/027846
PCT Pub. Date: Feb. 25, 2016

(65) Prior Publication Data
US 2017/0152914 A1    Jun. 1, 2017

(30) Foreign Application Priority Data
Aug. 21, 2014   (JP) ................. 2014-168758

(51) Int. Cl.
*F16F 15/123*    (2006.01)
*F16H 45/02*    (2006.01)
(Continued)

(52) U.S. Cl.
CPC .. *F16F 15/12366* (2013.01); *F16F 15/13469* (2013.01); *F16H 45/02* (2013.01);
(Continued)

(58) Field of Classification Search
CPC .......... F16F 15/12366; F16F 15/13469; F16H 45/02; F16H 2045/0205; F16H 2045/0278;
(Continued)

(56) References Cited

U.S. PATENT DOCUMENTS

| | | | | |
|---|---|---|---|---|
| 4,347,717 A | * | 9/1982 | Lamarche | ........... F16F 15/1202 |
| | | | | 192/213.1 |
| 5,725,080 A | * | 3/1998 | Lohaus | ................. F16F 15/123 |
| | | | | 192/213.22 |

(Continued)

FOREIGN PATENT DOCUMENTS

| CN | 106536970 A | 3/2017 |
|---|---|---|
| JP | 2004-308904 A | 11/2004 |

(Continued)

OTHER PUBLICATIONS

Oct. 27, 2015 Search Report issued in International Patent Application No. PCT/JP2015/073329.

*Primary Examiner* — Greg Binda
(74) *Attorney, Agent, or Firm* — Oliff PLC

(57) ABSTRACT

A damper device that includes a first torque transmission path including a first elastic body that transmits torque between the input element and the output element; and a second torque transmission path disposed in parallel with the first torque transmission path and including first and second intermediate elements, a second elastic body that transmits the torque between the input element and the first intermediate element, a third elastic body that transmits the torque between the first intermediate element and the second intermediate element, and a fourth elastic body that transmits the torque between the second intermediate element and the output element.

20 Claims, 7 Drawing Sheets

(51) Int. Cl.
*F16F 15/134* (2006.01)
*F16D 3/12* (2006.01)
*F16D 25/0635* (2006.01)

(52) U.S. Cl.
CPC ............ *F16D 3/12* (2013.01); *F16D 25/0635* (2013.01); *F16D 2300/22* (2013.01); *F16F 15/13484* (2013.01); *F16H 2045/0205* (2013.01); *F16H 2045/0226* (2013.01); *F16H 2045/0247* (2013.01); *F16H 2045/0278* (2013.01)

(58) Field of Classification Search
CPC ..... F16H 2045/0247; F16H 2045/0226; F16D 3/12; F16D 2300/22; F16D 25/0635
USPC ..................... 464/66.1, 68.7, 68.8; 192/3.29, 192/213–213.22
See application file for complete search history.

(56) References Cited

U.S. PATENT DOCUMENTS

| | | | |
|---|---|---|---|
| 8,403,762 | B2 | 3/2013 | Steinberger |
| 9,546,694 | B2* | 1/2017 | Julian ...................... F16D 3/74 |
| 9,791,019 | B2* | 10/2017 | Takikawa .............. F16F 15/134 |
| 2004/0226794 | A1 | 11/2004 | Sasse et al. |
| 2010/0096788 | A1 | 4/2010 | Farahati et al. |
| 2010/0133063 | A1 | 6/2010 | Degler |
| 2011/0287844 | A1 | 11/2011 | Steinberger |
| 2017/0159746 | A1 | 6/2017 | Takikawa et al. |

FOREIGN PATENT DOCUMENTS

| | | |
|---|---|---|
| JP | 2010-230155 A | 10/2010 |
| JP | 2012-506006 A | 3/2012 |
| JP | 2016-044733 A | 4/2016 |

* cited by examiner

DAMPER DEVICE

BACKGROUND

The disclosure of the present disclosure relates to damper devices including an input element to which power from an internal combustion engine is transmitted, and an output element.

Conventionally, a double path damper that is used in association with a torque converter is known as this type of damper devices (see, e.g., Published Japanese Translation of PCT Application No. 2012-506006). In this damper device, a vibration path from an engine and a lockup clutch to an output hub is divided into two parallel vibration paths B, C, and each of the two vibration paths B, C includes a pair of springs and a separate intermediate flange placed between the pair of springs. A turbine of a torque converter is connected to the intermediate flange of the vibration path B so that the resonant frequency varies between the two vibration paths. The natural frequency of the intermediate flange in the vibration path B is lower than that of the intermediate flange in the vibration path C. When the lockup clutch is engaged, engine vibration enters the two vibration paths B, C of the damper device. When the engine vibration having a certain frequency reaches the vibration path B including the intermediate flange connected to the turbine, the phase of the vibration from the intermediate flange to the output hub in the vibration path B is shifted by 180 degrees with respect to that of the input vibration. Since the natural frequency of the intermediate flange in the vibration path C is higher than that of the intermediate flange in the vibration path B, the vibration having entered the vibration path C is transmitted to the output huh without any phase shift. The vibration transmitted to the output hub through the vibration path B is thus 180 degrees out of phase with respect to that transmitted to the output hub through the vibration path C, whereby damped vibration can be obtained at the output hub.

SUMMARY

In the double path damper described in Published Japanese Translation of PCT Application No. 2012-506006, the two intermediate flanges (36, 38) are placed so as to free each other in the axial direction of the double path damper (see FIGS. 5A and 5B in Published Japanese Translation of PCT Application No. 2012-506006). The pair of springs (35a, 35b) forming the vibration path B are therefore placed so as to be located side by side in the radial direction of the double path damper, and the pair of springs (37a, 37b) forming the vibration path C are also placed so as to be located side by side in the radial direction of the double path damper. That is, the input-side springs (35a, 37a) of the vibration paths B, C are located radially outside the output-side springs (35b, 37b) of the vibration paths B, C. In the double path damper of Published Japanese Translation of PCT Application No. 2012-506006, flexibility in setting the natural frequencies of the vibration paths B, C by adjusting the rigidity (spring constant) of each spring and the weight (moment of inertia) of the intermediate flanges is reduced, which may make it difficult to improve vibration damping capability. Moreover, in the double path damper of Published Japanese Translation of PCT Application No. 2012-506006, resonant frequencies of the vibration paths B, C become close to each other, whereby sufficient vibration damping may not be achieved.

An exemplary aspect of the present disclosure improves vibration damping capability of a damper device having first and second torque transmission paths that are disposed in parallel.

A damper device according to the disclosure of the present disclosure is a damper device including an input element to which power from an internal combustion engine is transmitted and an output element. The damper device includes: a first torque transmission path including a first elastic body that transmits torque between the input element and the output element; and a second torque transmission path disposed in parallel with the first torque transmission path and including first and second intermediate elements, a second elastic body that transmits the torque between the input element and the first intermediate element, a third elastic body that transmits the torque between the first intermediate element and the second intermediate element, and a fourth elastic body that transmits the torque between the second intermediate element and the output element.

In this damper device, two resonances (e.g., resonance mainly due to the first and second intermediate elements and the third elastic body vibrating together, and resonance mainly due to the first and second intermediate elements vibrating in opposite phases from each other) occur in the second torque transmission path including the first and second intermediate elements, according to the frequency of vibration transmitted to the input element. Every time such resonances occur, vibration transmitted from the input element to the output element through the first torque transmission path becomes 180 degrees out of phase with respect to that transmitted from the input element to the output element through the second torque transmission path. Accordingly, two anti-resonance points can be set at which vibration is theoretically cancelled at the output element. Vibration damping capability of the damper device having the first and second torque transmission paths disposed in parallel can thus be very satisfactorily improved by making the frequencies at the two anti-resonance points equal to (closer to) the frequency of vibration (resonance) to be damped by the damper device.

BRIEF DESCRIPTION OF THE DRAWINGS

Modes for carrying out the disclosure of the present disclosure will be described below with reference to the accompanying drawings.

DETAILED DESCRIPTION OF EMBODIMENTS

Figure 1:
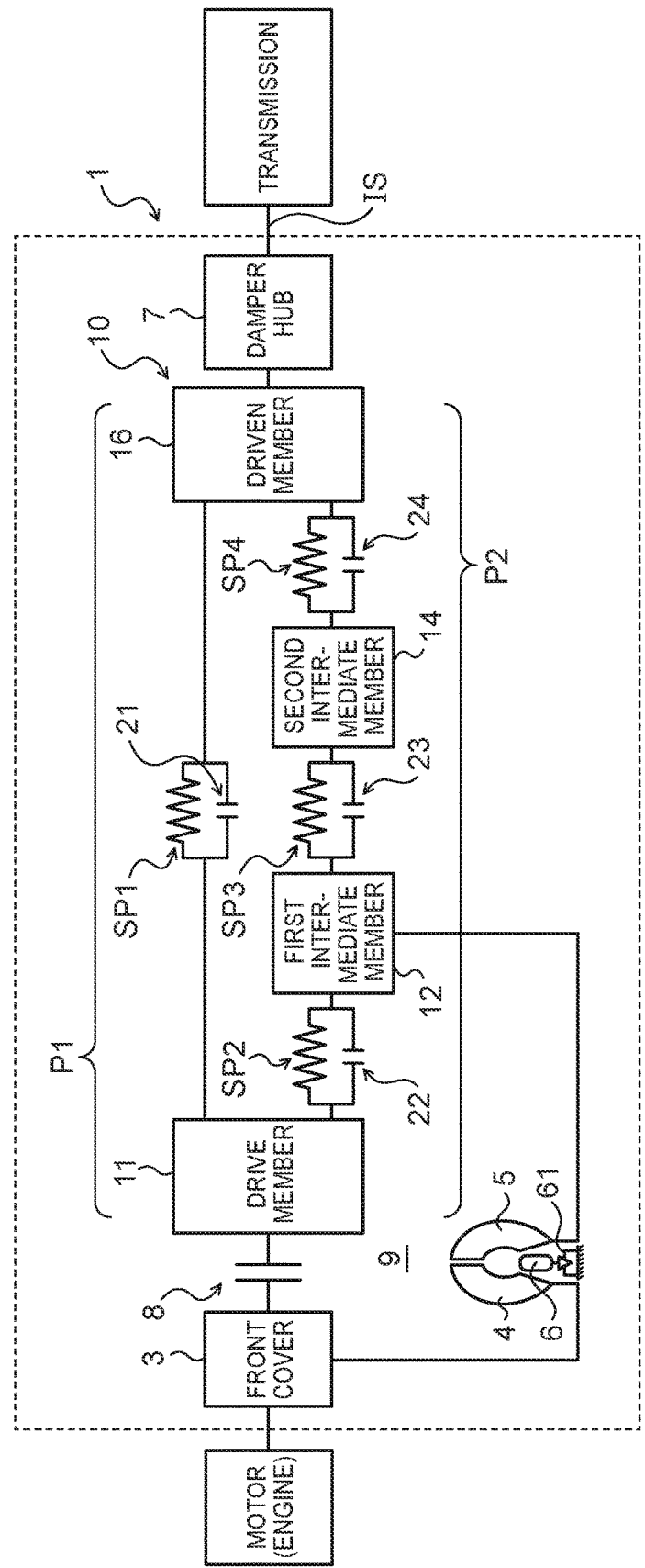
FIG. 1 is a schematic configuration diagram showing a starting device including a damper device according to an embodiment of the present disclosure.
Figure 2:
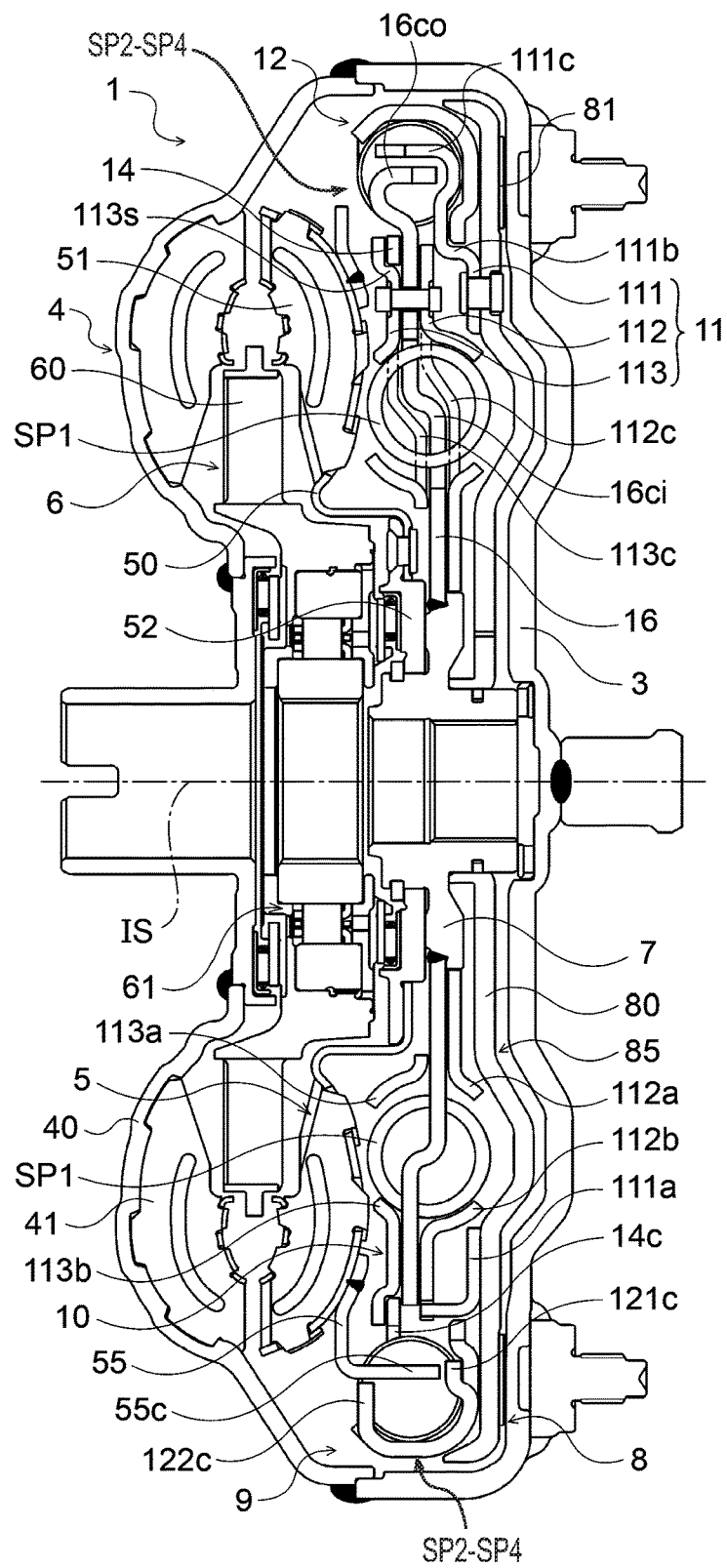
FIG. 2 is a sectional view showing the starting device of FIG. 1.
Figure 2A:
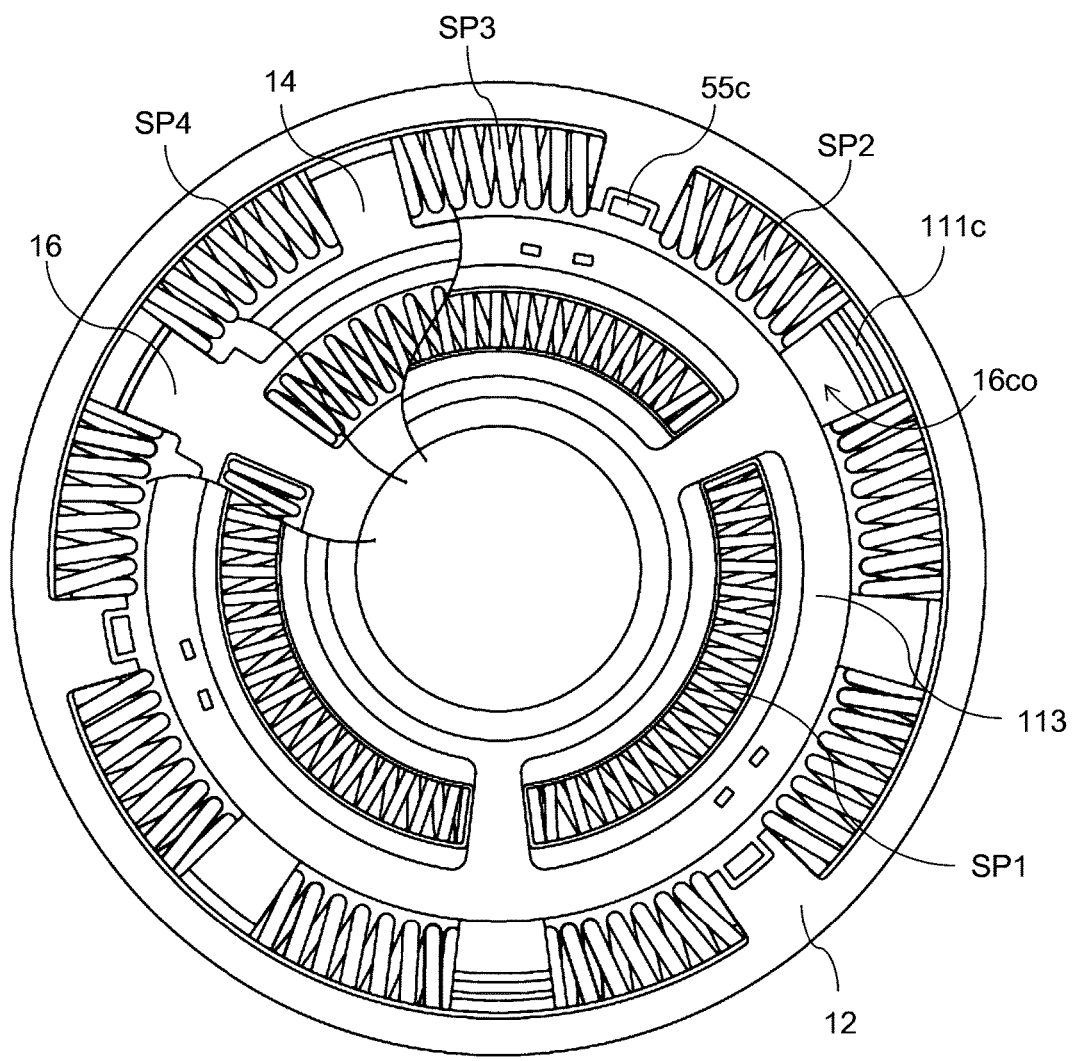
FIG. 2A is an axial view showing the starting device of FIG. 1.

FIG. 1 is a schematic configuration diagram showing a starting device 1 including a damper device 10 according to an embodiment of the present disclosure, FIG. 2 is a sectional view showing the starting device 1, and FIG. 2A is an axial view showing the starting device 1. The starting device 1 shown in these figures is mounted on a vehicle including an engine (internal combustion engine) serving as a motor. The starting device 1 includes, in addition to the damper device 10, a front cover 3 serving as an input member that is coupled to a crankshaft of the engine, a pump impeller (input-side hydraulic transmission element) 4 that is fixed to the front cover 3, a turbine runner (output-side hydraulic transmission element) 5 that can rotate coaxially with the pump impeller 4, a damper hub 7 serving as a power output member that is coupled to the damper device 10 and that is fixed to an input shaft IS of a transmission, which is an automatic transmission (AT) or a continuously variable transmission (CVT), a lockup clutch 8, etc.

In the following description, the "axial direction" basically refers to the direction in which the central axis (axis) of the starting device 1 or the damper device 10 extends, unless otherwise specified. The "radial direction" basically refers to the radial direction of the starting device 1, the damper device 10, or rotary elements of the damper device 10 etc., namely a linear direction extending from and perpendicularly to (in the direction of the radius) the central axis of the starting device 1 or the damper device 10, unless otherwise specified. The "circumferential direction" basically refers to the circumferential direction of the starting device 1, the damper device 10, or the rotary elements of the damper device 10 etc., namely the direction along the rotation direction of the rotary elements, unless otherwise specified.

As shown in FIG. 2, the pump impeller 4 has a pump shell 40 firmly fixed to the front cover 3, and a plurality of pump blades 41 disposed on the inner surface of the pump shell 40. As shown in FIG. 2, the turbine runner 5 has a turbine shell 50 and a plurality of turbine blades 51 disposed on the inner surface of the turbine shell 50. An inner peripheral part of the turbine shell 50 is fixed to a turbine hub 52 via a plurality of rivets. The turbine hub 52 is rotatably supported by the damper hub 7, and movement of the turbine hub 52 (turbine runner 5) in the axial direction of the starting device 1 is restricted by the damper hub 7 and a snap ring mounted on the damper hub 7.

The pump impeller 4 and the turbine runner 5 face each other, and a stator 6 that adjusts the flow of hydraulic oil (working fluid) from the turbine runner 5 to the pump impeller 4 is coaxially placed between the pump impeller 4 and the turbine runner 5. The stator 6 has a plurality of stator blades 60, and the stator 6 is rotated only in one direction by a one-way clutch 61. The pump impeller 4, the turbine runner 5, and the stator 6 form a torus (annular flow path) in which hydraulic oil is circulated, and function as a torque converter (hydraulic transmission device) having a function to amplify torque. In the starting device 1, the stator 6 and the one-way clutch 61 may be omitted, and the pump impeller 4 and the turbine runner 5 may function as a fluid coupling.

The lockup clutch 8 performs a lockup operation, or an operation of coupling the front cover 3 to the damper hub 7 via the damper device 10, and an operation of releasing the lockup coupling. In the present embodiment, the lockup clutch 8 is a single-plate hydraulic clutch and has a lockup piston (power input member) 80 that is placed inside the front cover 3 at a position near the inner wall surface on the engine side of the front cover 3 and that is fitted on the damper hub 7 so as to be movable in the axial direction. As shown in FIG. 2, a friction material 81 is bonded to an outer peripheral part of the surface of the lockup piston 80 which faces the front cover 3. A lockup chamber 85 that is connected to a hydraulic control device, not shown, via a hydraulic oil supply passage and an oil passage formed in the input shaft IS is defined between the lockup piston 80 and the front cover 3.

Hydraulic oil that is supplied from the hydraulic control device to the pump impeller 4 and the turbine runner 5 (torus) the radially outward direction from the axis side of the pump impeller 4 and the turbine runner 5 (from the vicinity of the one-way clutch 61) via the oil passage formed in the input shaft IS etc. can flow into the lockup chamber 85. Accordingly, if the pressure in a hydraulic transmission chamber 9 defined by the front cover 3 and the pump shell of the pump impeller 4 and the pressure in the lockup chamber 85 are kept equal to each other, the lockup piston 80 does not move toward the front cover 3 and the lockup piston 80 does not frictionally engage with the front cover 3. On the other hand, if the pressure in the lockup chamber 85 is reduced by the hydraulic control device, not shown, the lockup piston 80 moves toward the front cover 3 due to the pressure difference and frictionally engages with the front cover 3. The front cover 3 (engine) is thus coupled to the damper hub 7 via the damper device 10. The lockup clutch 8 may be a multi-plate hydraulic clutch including at least one friction engagement plate (a plurality of friction materials).

As shown in FIGS. 1 and 2, the damper device 10 includes, as the rotary elements, a drive member (input element) 11a first intermediate member (first intermediate element) 12, a second intermediate member (second intermediate element) 14, and a driven member (output element) 16. The damper device 10 further includes, as torque transmission elements (torque transmission elastic bodies), a plurality of (e.g., seven in the present embodiment) first springs (first elastic bodies) SP1 that transmit torque between the drive member 11 and the driven member 16, a plurality of (e.g., two in the present embodiment) second springs (second elastic bodies) SP2 that transmit torque between the drive member 11 and the first intermediate member 12, a plurality of (e.g., two in the present embodiment) third springs (third elastic bodies) SP3 that transmit torque between the first intermediate member 12 and the second intermediate member 14, and a plurality of (e.g., two in the present embodiment) fourth springs (fourth elastic bodies) SP4 that transmit torque between the second intermediate member 14 and the driven member 16. The third and fourth springs SP3, SP4 are not shown in FIG. 2.

That is, as shown in FIG. 1, the damper device 10 has a first torque transmission path P1 and a second torque transmission path P2 which are disposed in parallel. The first torque transmission path P1 includes only the first springs SP1 as elements placed between the drive member 11 and the driven member 16 and transmits torque between the drive member 11 and the driven member 16 via the plurality of first springs SP1. The second torque transmission path P2 includes, as elements placed between the drive member 11 and the driven member 16, the first and second intermediate members 12, 14 and the second, third, and fourth springs SP2, SP3, SP4, and transmits torque between the drive member 11 and the driven member 16 via the plurality of second springs SP2, the first intermediate member 12, the plurality of third springs SP3, the second intermediate member 14, and the plurality of fourth springs SP4.

In the present embodiment, the first to fourth springs SP1 to SP4 are linear coil springs each made of a metal material wound in a helical shape so as to have an axis extending straight when not subjected to a load. As compared to the case where the first to fourth springs SP1 to SP4 are, e.g., arc coil springs, the first to fourth springs SP1 to SP4 can be more properly extended and contracted along their axes, and what is called hysteresis (the difference between torque that is output from the driven member 16 when input torque to the drive member 11 increases and torque that is output from the driven member 16 when the input torque decreases) can be reduced. As shown in FIG. 2, in the present embodiment, the first springs SP1 have a larger outside diameter (coil diameter) than the second, third, and fourth springs SP2, SP3, SP4. The first springs SP1 also have a larger wire diameter (outside diameter of the coil wire) than the second, third, and fourth springs SP2, SP3, SP4.

As shown in FIG. 2, the drive member 11 of the damper device 10 includes an annular first plate member (first input member) 111 fixed to the lockup piston 80 of the lockup clutch 8, an annular second plate member (second input member) 112 rotatably supported (aligned) by the damper hub 7 and coupled to the first plate member 111 so as to rotate therewith, and an annular third plate member (third input member) 113 placed near the turbine runner 5 and coupled (fixed) to the second plate member 112 via a plurality of rivets. The drive member 11, namely the first to third plate members 111 to 113, thus rotate with the lockup piston 80, and the front cover 3 (engine) is coupled to the drive member 11 of the damper device 10 by engagement of the lockup clutch 8.

The first plate member 111 has an annular fixed portion 111a fixed to an outer peripheral part of the inner surface (surface to which the friction material 81 is not bonded) of the lockup piston 80 via a plurality of rivets, a tubular portion 111b extending in the axial direction from the outer periphery of the fixed portion 111a, and a plurality of (e.g., four in the present embodiment) spring contact portions (elastic body contact portions) 111c extended radially outward from the tubular portion 111b at intervals (regular intervals) in the circumferential direction. The plurality of spring contact portions 111c are formed symmetrically with respect to the axis of the first plate member 111 so that every two (each pair) of the spring contact portions 111c are located close to each other. For example, the two spring contact portions 111c in each pair flee each other at an interval corresponding to the natural length of the first spring SP1. The tubular portion 111b of the first plate member 111 has in its free end a plurality of engagement projections each fitted in a corresponding one of recesses formed in an outer peripheral part of the second plate member 112.

The second plate member 112 has a plurality of (e.g., five in the present embodiment) spring support portions 112a disposed at intervals (regular intervals) in the circumferential direction along the inner peripheral edge of the second plate member 112, a plurality of (e.g., five in the present embodiment) spring support portions 112b disposed radially outside the plurality of spring support portions 112a at intervals (regular intervals) in the circumferential direction and each facing a corresponding one of the spring support portions 112a in the radial direction of the second plate member 112, and a plurality of (e.g., five in the present embodiment) spring contact portions (inner contact portions) 112c. The third plate member 113 has a plurality of (e.g., five in the present embodiment) spring support portions 113a disposed at intervals (regular intervals) in the circumferential direction along the inner peripheral edge of the third plate member 113, a plurality of (e.g., five in the present embodiment) spring support portions 113b disposed radially outside the plurality of spring support portions 113a at intervals (regular intervals) in the circumferential direction and each facing a corresponding one of the spring support portions 113a in the radial direction of the third plate member 113, and a plurality of (e.g., five in the present embodiment) spring contact portions (inner contact portions) 113c.

Each of the plurality of spring support portions 112a of the second plate member 112 supports (guides) the lockup piston 80 side of a corresponding one of the first springs SP1 (one first spring SP1 each) from the inner peripheral side. Each of the plurality of spring support portions 112b supports (guides) the lockup piston 80 side of a corresponding one of the first springs SP1 (one first spring SP1 each) from the outer peripheral side. Each of the plurality of spring support portions 113a of the third plate member 113 supports (guides) the turbine runner 5 side of a corresponding one of the first springs SP1 (one first spring SP1 each) from the inner peripheral side. Each of the plurality of spring support portions 113b supports (guides) the turbine runner 5 side of a corresponding one of the first springs SP1 (one first spring SP1 each) from the outer peripheral side. A part of the first springs SP1 (in the present embodiment, five of the seven is thus supported by the spring support portions 112a, 112b of the second plate member 112 and the spring support portions 113a, 113b of the third plate member 113 of the drive member 11 so as to be arranged side by side in the circumferential direction of the damper device 10 (the circumferential direction of the first intermediate member 12).

The plurality of spring contact portions 112c of the second plate member 112 are disposed such that one spring contact portion 112c is located between every two sets of the spring support portions 112a, 112b the sets adjoining each other in the circumferential direction. When the damper device 10 is in a mounted state, each spring contact portion 112c is located between adjoining, ones of the first springs SP1 and contacts the ends of these adjoining first spring, SP1. The plurality of spring contact portions 113c of the third plate member 113 are disposed such that one spring contact portion 113c is located between every two sets of the spring support portions 113a, 113b, the sets adjoining each other in the circumferential direction. When the damper device 10 is in the mounted state, each spring contact portion 113c is located between adjoining ones of the first springs SP1 and contacts the ends of these adjoining first springs SP1.

The first intermediate member 12 is foil med in an annular shape so as to support (guide) the outer peripheral parts and the lockup piston 80 sides (the right sides in FIG. 2) of the plurality of (two each) first to fourth springs SP1 to SP4. As shown in FIG. 2, the first intermediate member 12 is rotatably supported (aligned) by the tubular portion (first support portion) 111b of the first plate member 111 of the drive member 11 and is placed in an outer peripheral region of the hydraulic transmission chamber 9, namely is placed outside the part of the first springs SP1 in the radial direction of the damper device 10, such that the entire first intermediate member 12 is located near the outer periphery of the damper device 10 (the front cover 3). Since the first intermediate member 12 is thus placed in the outer peripheral region of the hydraulic transmission chamber 9, the moment of inertia (inertia) of the first intermediate member 12 can further be increased.

The first intermediate member 12 supports the second springs SP2, the third springs SP3, and the fourth springs SP4 such that the second to fourth springs SP2 to SP4 are arranged side by side in the circumferential direction of the first intermediate member 12 (the damper device 10) in order of, e.g., the second, third, fourth, second, third, and fourth springs. The second springs SP2, the third springs SP3, and the fourth springs SP4 are thus placed outside the part of the first springs SP1, which is supported by the drive member 11 (the second and third plate members 112, 113), in the radial direction of the damper device 10. Since the second springs SP2, the third springs SP3, and the fourth springs SP4 are thus placed in the outer peripheral region of the hydraulic transmission chamber 9 so as to surround the part of the plurality of first springs SP1, the axial length of the damper device 10 and thus the starting device 1 can further be reduced. The first intermediate member 12 has a plurality (e.g., two in the present embodiment) first spring contact portions (elastic body contact portions) 121c and a plurality of (e.g., two in the present embodiment) second spring contact portions (elastic body contact portions) 122c each facing a corresponding one of the first spring contact portions 121c in the axial direction. The first and second spring contact portions 121c, 122c are located between the second and third springs SP2, SP3 adjoining each other, and contact the ends of these second and third springs SP2, SP3.

The second intermediate member 14 is a plate-like annular member and has its inner peripheral surface rotatably supported (aligned) by an annular support portion (second support portion) 113s of the third plate member 113 of the drive member 11. The second intermediate member 14 is placed in the outer peripheral region of the hydraulic transmission camber 9, namely is placed outside the part of the first springs SP1 in the radial direction of the damper device 10, such that the entire second intermediate member 14 is located near the outer periphery of the damper device 10 (the front cover 3). The second intermediate member 14 has a plurality of (e.g., two in the present embodiment) spring contact portions (elastic body contact portions) 14c extending radially outward from the outer peripheral surface of the second intermediate member 14. Each spring contact portion 14c of the second intermediate member 14 is located between the third and fourth springs SP3, SP4 adjoining each other, and contacts the ends of these third and fourth springs SP3, SP4.

When the damper device 10 is in the mounted state, one of each pair of spring contact portions 111c which is located closer to the second spring SP2 contacts an end of this second spring SP2, and the other spring contact portion 111c that is located closer to the fourth spring SP4 contacts an end of this fourth spring SP4. Accordingly, when the damper device 10 is in the mounted state, one end of each second spring SP2 contacts a corresponding one of the spring contact portions 111c of the drive member 11, and the other end of each second spring SP2 contacts a corresponding one of the spring contact portions 121c and a corresponding one of the spring contact portions 122c of the first intermediate member 12. When the damper device 10 is in the mounted state, one end of each third spring SP3 contacts a corresponding one of the first spring contact portions 121c and a corresponding one of the second spring contact portions 122c of the first intermediate member 12, and the other end of each third spring SP3 contacts a corresponding one of the spring contact portions 14c of the second intermediate member 14. When the damper device 10 is in the mounted state, one end of each fourth spring SP4 contacts a corresponding one of the spring contact portions 14c of the second intermediate member 14, and the other end of each fourth spring SP4 contacts a corresponding one of the spring contact portions 111c of the drive member 11.

As shown in FIG. 2, the driven member 16 is placed bet ten the second plate member 112 and the third plate member 113 of the drive member 11 in the axial direction and is fixed to the damper hub 7 by, e.g., welding. The driven member 16 has a plurality of (e.g., five in the present embodiment) inner spring contact portions (inner contact portions) 16ci formed near the inner peripheral edge of the driven member 16 at intervals in the circumferential direction, and a plurality of (e.g., four in the present embodiment) outer spring contact portions (outer contact portions 16co formed radially outside the plurality of inner spring; contact portions 16ci at intervals in the circumferential direction. The plurality of outer spring contact portions 16co are formed symmetrically with respect to the axis of the driven member 16 so that every two (each pair) of the outer spring contact portions 16co are located close to each other, or example, the two outer spring contact portions 16co in each pair taco each other at an interval corresponding to the natural length of the first spring SP1.

When the damper device 10 is in the mounted state, each inner spring contact portion 16ci of the driven member 15 is located between adjoining ones of the first springs SP1 and contacts the ends of the adjoining first springs SP1, like the spring contact portions 112c, 113c of the drive member 11. When the damper device 10 is in the mounted state, both ends of each of the two first springs SP1 placed closer to the outer periphery (f the damper device 10 are also supported by a corresponding one of the pairs of outer spring contact portions 16co of the driven member 16. When the damper device 10 is in the mounted state, one of each pair of outer spring contact portions 16co which is located closer to the second spring SP2 contacts an end of this second spring SP2, and the other outer spring contact portion 16co that is located closer to the fourth spring SP4 contacts an end of this fourth spring SP4. Accordingly, when the damper device 10 is in the mounted state, the one end of each second spring SP2 also contacts a corresponding one of the outer spring contact portions 16co of the driven member 16, and the other end of each fourth spring SP4 also contacts a corresponding one of the outer spring contact portions 16co of the driven member 16. The driven member 16 is thus coupled to the drive member 11 through the plurality of first springs SP1, namely through the first torque transmission path P1, and through the plurality of second springs SP2, the first intermediate member 12, the plurality of third springs SP3, the second intermediate member 14, and the plurality of fourth springs SP4, namely through the second torque transmission path P2.

As shown in FIG. 2, in the present embodiment, the turbine shell 50 of the turbine runner 5 has an annular turbine coupling member 55 fixed thereto by, e.g., welding. The turbine coupling member 55 has a plurality of (e.g., two in the present embodiment) spring contact portions 55c formed at intervals in the circumferential direction in its outer peripheral part so as to extend in the axial direction. Each spring contact portion 55c of the turbine coupling member 55 is located between the second and third springs SP2, SP3 adjoining each other (operating in series) and contacts the ends of these second and third springs SP2, SP3. The first intermediate member 12 and the turbine runner 5 are thus coupled so as to rotate together. Since the turbine runner 5 (and the turbine hub 52) is coupled to the first intermediate member 12, a substantial moment of inertia of the first intermediate member 12 (the sum of the moments of inertia of the first intermediate member 12, the turbine runner 5, etc.) can further be increased. Since the turbine runner 5 is coupled to the first intermediate member 12 placed radially outside the part of the first springs SP1 (the five first springs SP1 placed closer to the inner periphery), namely placed in the outer peripheral region of the hydraulic transmission chamber 9, the turbine coupling member 55 can be prevented from passing between the third plate member 113 of the drive member 11 or the first springs SP1 and the turbine runner 5 in the axial direction. An increase in axial length of the damper device 10 and thus the starting device 1 can thus be more satisfactorily restrained.

As shown in FIG. 1, the damper device 10 further includes a first stopper 21 that restricts deflection of the first springs SP1, a second stopper 22 that restricts deflection of the second springs SP2, a third stopper 23 that restricts deflection of the third springs SP3, and a fourth stopper 24 that restricts deflection of the fourth springs SP4. In the present embodiment, the first stopper 21 restricts relative rotation between the drive member 11 and the driven member 16. The second stopper 22 restricts relative rotation between the drive member 11 and the first intermediate member 12. The third stopper 23 restricts relative rotation between the first intermediate member 12 and the second intermediate member 14. The fourth stopper 24 restricts relative rotation between the second intermediate member 14 and the driven member 16. Each of the first to fourth stoppers 21 to 24 restricts deflection of the springs associated therewith trout the time when the input torque to the drive member 11 reaches predetermined torque (first threshold) T1 smaller than torque T2 (second threshold) corresponding to a maximum torsion angle θmax of the damper device 10.

Setting the operation timings of the first to fourth stoppers 21 to 24 as appropriate allows the damper device 10 to have multi-stage (two or more stages) damping characteristics. In the present embodiment three of the first to fourth stoppers 21 to 24 which correspond to the first to fourth springs SP1 to SP4 other than the springs having the largest spring constant (e.g., the third springs SP3 in the present embodiment) restrict deflection of their associated springs when the input torque to the drive member 11 reaches the torque T1. One of the first to fourth stoppers 21 to 24 (e.g., the third stopper 23 in the present embodiment) which corresponds to the springs having the largest spring constant out of the first to fourth springs SP1, SP4 operates when the input torque to the drive member 11 reaches the torque T2 corresponding to the maximum torsion angle θmax. The damper device 10 thus has two-stage damping characteristics. The configurations of the first to fourth stoppers 21 to 24 are not limited to the illustrated configurations, and one of the first stopper 21 and the other of the second and third stoppers 23 may be omitted.

As can be seen from FIG. 1, with the lockup coupling being released by the lockup clutch 8 of the starting device 1 configured as described above, torque (power) transmitted from the engine to the front cover 3 is transmitted to the input shaft IS of the transmission through a path formed by the pump impeller 4, the turbine runner 5, the first intermediate member 12, the third springs SP3, the second intermediate member 14, the fourth springs SP4, the driven member 16, and the damper hub 7. On the other hand, with the lockup operation being performed by the lockup clutch 8 of the starting device 1, torque transmitted from the engine to the drive member 11 via the front cover 3 and the lockup clutch 8 is transmitted to the driven member 16 and the damper hub 7 through the first torque transmission path P1 including the plurality of first springs SP1 and the second torque transmission path P2 including the plurality of second springs SP2, the first intermediate member 12, the plurality of third springs SP3, the second intermediate member 14, and the plurality of fourth springs SP4. The first springs SP1 and the second, third, and fourth springs SP2, SP3, SP4 operate in parallel to damp (absorb) torque fluctuation transmitted to the drive member 11, until the input torque to the drive member 11 reaches the torque T1.

The design procedure of the damper device 10 will be described below.

As described above, in the damper device 10, the first springs SP1 and the second, third, and fourth springs SP2, SP3, SP4 operate in parallel until the input torque transmitted to the drive member 11 reaches the torque T1. When the first springs SP1 and the second, third, and fourth springs SP2, SP3, SP4 operate in parallel, resonance mainly due to the first and second intermediate members 12, 14 and the third springs SP3 vibrating together and resonance mainly due to the first and second intermediate members 12, 14 vibrating in opposite phases from each other occur in the second torque transmission path P2 including the first and second intermediate members 12, 14, according to the frequency of vibration transmitted from the engine to the drive member 11. Every time such resonances occur, vibration transmitted from the drive member 11 to the driven member 16 through the first torque transmission path P1 becomes 180 degrees out of phase with respect to that transmitted from the drive member 11 to the driven member 16 through the second torque transmission path P2 in which the resonance has occurred. The damper device 10 can thus damp the vibration at the driven member 16 by using the phase shift of the vibration between the first and second torque transmission paths P1, P2.

The inventors carried out intensive research and analysis in order to further improve vibration damping capability of the damper device 10 having such characteristics, and obtained an equation of motion as given by the following expression (1) for a vibration system including the damper device 10 with torque being transmitted from the engine to the drive member 11 by the lockup operation. In the expression (1), "$J_1$" represents the moment of inertia of the drive member 11, "$J_{21}$" represents the moment of inertia of the first intermediate member 12, "$J_{22}$" represents the moment of inertia of the second intermediate member 14, "$J_3$" represents the moment of inertia of the driven member 16, "$\theta_1$" represents the torsion angle of the drive member 11, "$\theta_{21}$" represents the torsion angle of the first intermediate member 12, "$\theta_{22}$" presents the torsion angle of the second intermediate member 14. "$\theta_3$" represents the torsion angle of the driven member 16, "$k_1$" represents the combined spring constant of the plurality of first springs SP1 that operate in parallel between the drive member 11 and the driven member 16, "$k_2$" represents the combined spring constant of the plurality of second springs SP2 that operate in parallel between the drive member 11 and the first intermediate member 12, "$k_3$" represents the combined spring constant of the plurality of third springs SP3 that operate in parallel between the first intermediate member 12 and the second intermediate member 14, "$k_4$" represents the combined spring constant of the plurality of fourth springs SP4 that operate in par rile between the second intermediate member 14 and the driven member 16, "$k_R$" represents the rigidity, namely the spring constant, of the transmission, a drive shaft, etc. that are disposed between the driven member 16 and wheels of the vehicle, and "T" represents the input torque that is transmitted from the engine to the drive member 11.

[Formula 1]

$$\begin{pmatrix} J_1 & 0 & 0 & 0 \\ 0 & J_{21} & 0 & 0 \\ 0 & 0 & J_{22} & 0 \\ 0 & 0 & 0 & J_3 \end{pmatrix} \begin{pmatrix} \ddot{\theta}_1 \\ \ddot{\theta}_{21} \\ \ddot{\theta}_{22} \\ \ddot{\theta}_3 \end{pmatrix} + \begin{pmatrix} k_1+k_2 & -k_2 & 0 & -k_1 \\ -k_2 & k_2+k_3 & -k_3 & 0 \\ 0 & -k_3 & k_3+k_4 & -k_4 \\ -k_1 & 0 & -k_4 & k_1+k_4+k_R \end{pmatrix} \begin{pmatrix} \theta_1 \\ \theta_{21} \\ \theta_{22} \\ \theta_3 \end{pmatrix} = \begin{pmatrix} T \\ 0 \\ 0 \\ 0 \end{pmatrix} \quad (1)$$

The inventors also assumed that the input torque 1 vibrates periodically as given by the following expression (2) and that the torsion angle $\theta_1$ of the drive member 11, the torsion angle $\theta_{21}$ of the first intermediate member 12, the torsion angle $\theta_{22}$ of the second intermediate member 14, and the torsion angle $\theta_3$ of the driven member 16 respond (vibrate) periodically as given by the following expression (3). In the expressions (2), (3), "ω" represents the angular frequency of periodic fluctuation (vibration) of the input torque T. In the expression (3), "$\Theta_1$" represents the amplitude of vibration (vibration amplitude, i.e., the maximum torsion angle) of the drive member 11 which occurs as the torque from the engine is transmitted thereto, "$\Theta_{21}$" represents the amplitude of vibration (vibration amplitude) of the first intermediate member 12 which occurs as the torque from the engine is transmitted to the drive member 11, "$\Theta_{22}$" represents the amplitude of vibration (vibration amplitude) of the second intermediate member 14 which occurs as the torque from the engine is transmitted to the drive member 11, and "$\Theta_3$" represents the amplitude of vibration (vibration amplitude) of the driven member 16 which occurs as the torque from the engine is transmitted to the drive member 11. Under the above assumption, an identity as given by the following expression (4) can be obtained by substituting the expressions (2), (3) for the expression (1) and eliminating "sin ωt" from both sides of the resultant expression.

[Formula 2]

$$T = T_0 \sin\omega t \quad (2)$$

$$\begin{bmatrix} \theta_1 \\ \theta_{21} \\ \theta_{22} \\ \theta_3 \end{bmatrix} = \begin{bmatrix} \Theta_1 \\ \Theta_{21} \\ \Theta_{22} \\ \Theta_3 \end{bmatrix} \sin\omega t \quad (3)$$

$$\begin{pmatrix} -\omega^2 J_1+k_1+k_2 & -k_2 & 0 & -k_1 \\ -k_2 & -\omega^2 J_{21}+k_2+k_3 & -k_3 & 0 \\ 0 & -k_3 & -\omega^2 J_{22}+k_3+k_4 & -k_4 \\ -k_1 & 0 & -k_4 & -\omega^2 J_3+k_1+k_4+k_R \end{pmatrix} \begin{pmatrix} \Theta_1 \\ \Theta_{21} \\ \Theta_{22} \\ \Theta_3 \end{pmatrix} = \begin{pmatrix} T_0 \\ 0 \\ 0 \\ 0 \end{pmatrix} \quad (4)$$

The inventors looked at the fact that when the vibration amplitude $\Theta_3$ of the driven member 16 in the expression (4) is zero, vibration from the engine is theoretically completely damped by the damper device 10 and vibration is theoretically not transmitted to the transmission, the drive shaft, etc. that are located in the stages after the driven member 16. In view of this, the inventors solved the identity as given by the expression (4) for the vibration amplitude $\Theta_3$ and obtained a conditional expression as given by the following expression (5) by setting $\Theta_3=0$. The expression (5) is a quadratic equation for the square $\omega^2$ of the angular frequency of periodic fluctuation of the input torque T. In the case where the square $\omega^2$ of the angular frequency is one of the two solutions for the expression (5), vibration from the engine transmitted from the drive member 11 to the driven member 16 through the first torque transmission path P1 and vibration transmitted from the drive member 11 to the driven member 16 through the second torque transmission path P2 cancel each other, and the vibration amplitude $\Theta_3$ of the driven member 16 becomes theoretically equal to zero. It should be understood from this analysis result that, in the damper device 10 having the above configuration, a total of two anti-resonance points can be set at which the vibration amplitude $\Theta_3$ of the driven member 16 becomes theoretically zero when vibration transmitted to the driven member 16 through the first torque transmission path P1 becomes 180 degrees out of phase with respect to that transmitted to the driven member 16 through the second torque transmission path P2 due to occurrence of resonance.

[Formula 3]

$$J_{21}J_{22}k_1(\omega^2)^2 - \{J_{21}k_4 + (J_{21}+J_{22})k_3 + J_{22}\}k_3 + J_{22}k_2\}k_1(\omega^2) + (k_1k_2k_3 + k_2k_3k_4 + k_3k_4k_1 + k_4k_1k_2) = 0 \quad (5)$$

In the vehicle having, the engine mounted thereon as a source of power for driving the vehicle, the lockup engine speed Nlup of the lockup clutch is reduced to promptly mechanically transmit torque from the engine to the transmission, whereby power transmission efficiency between the engine and the transmission can be improved and thus fuel economy of the engine can be improved. However, in the low engine speed range of about 500 rpm to 1,500 rpm which can be the range in which the lockup engine speed Nlup is set larger vibration is transmitted from the engine to the drive member 11 via the lockup clutch, and an increase in vibration level is significant especially in vehicles having mounted thereon an engine with a smaller number of cylinders such as a three-cylinder or four-cylinder engine. Accordingly, in order for large vibration not to be transmitted to the transmission etc. when and immediately after the lockup operation is performed, it is necessary to further reduce the vibration level in an engine speed range near the lockup engine speed Nlup of the entire damper device 10 (the driven member 16) that transmits torque (vibration) from the engine to the transmission with the lockup operation being performed.

In view of this, the inventors configured the damper device 10 so that an anti-resonance point A1 on the lower engine speed side (lower frequency side) was formed when the engine speed was in the range of 500 rpm to 1,500 rpm (the expected range in which the lockup engine speed Nlup is set), based on the lockup engine speed Nlup determined for the lockup clutch 8. The two solutions $\omega_1$, $\omega_2$ for the above expression (5) can be obtained as given by the following expressions (6), (7) based on the quadratic formula, and $\omega_1 > \omega_2$. In the expressions (6), (7), "a" is as given by the following expression (8), "b" is as given by the following expression (9), and "c" is as given by the following expression (10). The frequency (hereinafter referred to as the "lower frequency") $fa_1$ at the anti resonance point A1 on the lower engine speed side (lower frequency side) is given by the following expression (11), and the frequency $fa_2$ at an anti-resonance point A2 on the higher engine speed side (higher frequency side) ($fa_2 > fa_1$) is given by the following expression (12). The engine speed $Nea_1$ corresponding to the lowest frequency $fa_1$ is given by $Nea_1 = (120/n) \cdot fa_1$, where "n" represents the number of cylinders of the engine.

[Formula 4]

$$\omega_1 = \sqrt{\frac{b - \sqrt{b^2 - 4ac}}{2a}} \qquad (6)$$

$$\omega_2 = \sqrt{\frac{b + \sqrt{b^2 - 4ac}}{2a}} \qquad (7)$$

$$a = J_{21} J_{22} k_1 \qquad (8)$$

$$b = \{J_{21} k_4 + (J_{21} + J_{22}) k_3 + J_{22} k_2\} k_1 \qquad (9)$$

$$c = k_1 k_2 k_3 + k_2 k_3 k_4 + k_3 k_4 k_1 + k_4 k_1 k_2 \qquad (10)$$

$$fa_1 = \frac{1}{2\pi} \sqrt{\frac{b - \sqrt{b^2 - 4ac}}{2a}} \qquad (11)$$

$$fa_2 = \frac{1}{2\pi} \sqrt{\frac{b + \sqrt{b^2 - 4ac}}{2a}} \qquad (12)$$

Accordingly, in the damper device 10, the combined spring constant $k_1$ of the plurality of first springs SP1, the combined spring constant $k_2$ of the plurality of second springs SP2, the combined spring constant $k_3$ of the plurality of third springs SP3, the combined spring constant $k_4$ of the plurality of fourth springs SP4, the moment of inertia $J_{21}$ of the first intermediate member 12, and the moment of in $J_{22}$ of the second intermediate member 14 (the moment of inertia of the turbine runner 5 etc. coupled to the first intermediate member 12 so as to rotate therewith is also taken into account (the sum of the moments of inertia of the first intermediate member 12, the turbine runner, etc.)) are selected and set so as to satisfy the following expression (13). That is, in the damper device 10, the spring constants $k_1$, $k_2$, $k_3$, $k_4$ of the first, second, third, and fourth springs SP1 to SP4 and the moments of inertia $J_{21}$, $J_{22}$ of the first and second intermediate members 12, 14 are determined based on the lowest frequency $fa_1$ (and the lockup engine speed Nlup).

[Formula 5]

$$500 \text{ rpm} \leq \frac{120}{n} fa_1 \leq 1500 \text{ rpm} \qquad (13)$$

Figure 3:
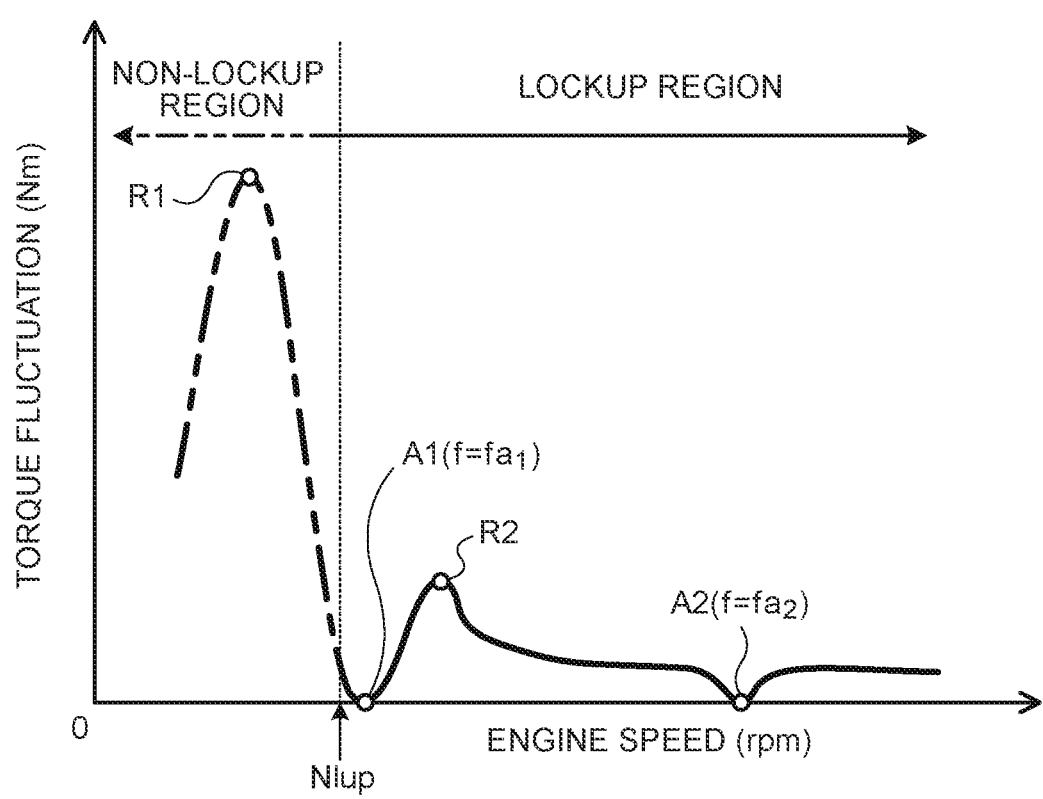
FIG. 3 is an illustration showing the relationship between the engine speed and the torque fluctuation in an output element of the damper device shown in FIG. 1 etc.

The anti-resonance point A1 on the lower engine speed side at which the vibration amplitude $\Theta_3$ of the driven member 16 can be theoretically zero (can further be reduced) is thus set in the low engine speed range of 500 rpm to 1,500 rpm (the expected range in which the lockup engine speed Nlup is set), whereby the resonance that produces the anti-resonance point A1 (the resonance that has to be caused in order to form the anti-resonance point A1, see the resonance point R1 in FIG. 3) can be shifted to the lower engine speed side (the lower frequency side) so as to be included in a non-lockup region (see the long dashed double-short dashed line in FIG. 3) of the lockup clutch 8, as shown in FIG. 3. This allows the lockup operation (coupling between the engine and the drive member 11) to be performed at a lower engine speed, and can further improve the vibration damping capability of the damper device 10 in the low engine speed range in which vibration from the engine tends to be large.

Moreover, when the damper device 10 is configured so as to satisfy the expression (13), it is preferable to select and set the spring constants $k_1$, $k_2$, $k_3$, $k_4$ and the moments of inertia $J_{21}$, $J_{22}$ so that the frequency of the resonance (resonance point R1) that produces the anti-resonance point A1 on the lower engine speed side is lower than the lowest frequency $fa_1$ and is as low as possible (and so that this resonance has the largest amplitude among primary resonances). This can further reduce the lowest frequency $fa_1$ and allows the lockup operation to be performed at a much lower engine speed. The spring constants $k_1$, $k_2$, $k_3$, $k_4$ and the moments of inertia $J_{21}$, $J_{22}$ can be selected and set so that the anti-resonance point A1 on the lower engine speed side is produced by occurrence of resonance mainly due to the first and second intermediate members 12, 14 and the third springs SP3 vibrating together. In this case, the resonance (resonance point R1) that produces the anti-resonance point A1 is hypothetical resonance that does not occur in the engine speed range in which the damper device 10 is used, and the engine speed corresponding to the frequency of the resonance that produces the anti-resonance point A1 is lower than the lockup engine speed Nlup of the lockup clutch 8.

As shown in FIG. 3, in the damper device 1) configured as described above, the subsequent resonance (see the resonance point R2 in FIG. 3, e.g., the resonance mainly due to the first and second intermediate members 12, 14 vibrating in opposite phases from each other) occurs as the engine speed increases after the anti-resonance point A1 is produced. The second anti-resonance point A2 is thus produced as this resonance occurs. Accordingly, in the damper device 10, occurrence of this resonance can be satisfactorily restrained by making the second anti-resonance point A2 (frequency $fa_1$) equal to, e.g., (the frequency of) the resonance point of the input shaft IS of the transmission. That is, the vibration damping capability of the damper device 10 having the first and second torque transmission paths P1, P2 disposed in parallel can be very satisfactorily improved by making the frequencies $fa_1$, $fa_2$ of the two anti-resonance points A1, A2 equal to (closer to) the frequency of the vibration (resonance) to be damped.

Moreover, in the damper device 10 configured as described above, in order to further improve the vibration damping capability at around the lockup engine speed Nlup, it is necessary to separate the lockup engine speed Nlup from the engine speed corresponding to the resonance point R2 as much as possible. Accordingly, when the damper device 10 is configured so as to satisfy the expression (13), it is preferable to select and set the spring constants $k_1$, $k_2$, $k_3$, $k_4$ and the moments of inertia $J_{21}$, $J_{22}$ so as to satisfy Nlup≤

(120/n)·$fa_1$(=$Nea_1$). This allows the lockup operation to be performed by the lockup clutch 8 while satisfactorily restraining transmission of vibration to the input shaft IS of the transmission, and allows vibration from the engine to be very satisfactorily damped by the damper device 10 immediately after the lockup operation is performed.

In the damper device 10, the second, third, and fourth springs SP2, SP3, SP4 in the second torque transmission path P2 are disposed outside at least a part of the first springs SP1 in the first torque transmission path P1 in the radial direction of the damper device 10. This can further reduce the axial length of the damper device 10, and can further reduce the frequency of the resonance that produces the anti-resonance point A1 on the lower engine speed side (lower frequency side) by adjustment of the spring constants (rigidity) of the second, third, and fourth springs SP2, SP3, SP4 and the moments of inertia $J_{21}$, $J_{22}$ of the first and second intermediate members 12, 14.

Moreover, when the damper device 10 is configured so as to satisfy the expression (13), the spring constant $k_1$ of the first springs SP1 can be made smaller than the spring constants $k_2$, $k_3$, $k_4$ of the second, third, and fourth springs SP2, SP3, SP4. This can further reduce the overall rigidity of the damper device 10 and can further increase the maximum torsion angle θmax of the damper device 10.

When the damper device 10 is configured so as to satisfy the expression (13), the spring constant $k_3$ of the third springs SP3 can be made larger than the spring constants $k_1$, $k_2$, $k_4$ of the first, second, and fourth springs SP1, SP2, SP4. This allows the first and second intermediate members 12, 14 and the third springs SP3 to resonate together at a lower engine speed (lower frequency) than the anti resonance point A1 on the lower engine speed side, so that the anti-resonance point A1 can be set at a lower engine speed. In addition, coupling the first intermediate member 12 to the turbine runner 5 so that the first intermediate member 12 and the turbine runner 5 rotate together can further increase the substantial moment of inertia $J_{21}$ of the first intermediate member 12 (the sum of the moments of inertia of the first intermediate member 12, the turbine runner 5, etc.). The frequency $fa_1$ at the anti-resonance point A1 can therefore further be reduced, and the anti-resonance point A1 can be set at a lower engine speed (lower frequency). Instead of the first intermediate member 12, the second intermediate member 14 may be coupled to the turbine runner 5 so as to rotate therewith.

Moreover, in the damper device 10, the first springs SP1 have a larger outside diameter (coil diameter) than the second, third, and fourth springs SP2, SP3, SP4. Since the first springs SP1 placed closer to the inner periphery have a larger outside diameter, the torsion angle of the first springs SP1 can be about the same as that of the second, third, and fourth springs SP2, SP3, SP4 placed closer to the outer periphery. Moreover, torque can be satisfactorily allocated to the first torque transmission path P1 by making the wire diameter of the first springs SP1 larger than that of the second, third, and fourth springs SP1, SP3, SP4.

Designing the damper device 10 based on the frequency (lowest frequency) $fa_1$ at the anti-resonance point A1 as described above can very satisfactorily improve the vibration damping capability of the damper device 10. The research and analysis conducted by the inventors show that, in the case where the lockup engine speed Nlup is set to, e.g., around 1,000 rpm, practically very satisfactory results are obtained by configuring the damper device 10 so as to satisfy, e.g., 900 rpm≤(120/n)·$fa_1$≤1,200 rpm. The analysis conducted by the inventors also shows that practically very satisfactory vibration damping capability of the damper device 10 can be ensured by setting the ratios of the spring constants $k_1$, $k_2$, $k_3$, $k_4$ of the first to fourth springs SP1 to SP4 to the equivalent spring constant $k_{total}$(=$k_1$+(1/$k_2$+1/$k_3$+1/$k_4$)$^{-1}$) of the damper device 10 so as to satisfy the following relationships.

$$0.30 \leq k_1/k_{total} \leq 0.90$$

$$0.65 \leq k_2/k_{total} \leq 1.25$$

$$8.00 \leq k_3/k_{total} \leq 8.60$$

$$0.50 \leq k_4/k_{total} \leq 1.10$$

Moreover, the drive member 11 of the damper device 10 has the spring contact portions 112c, 113c that contact the ends of the first springs SP1, and the spring contact portions 111c that contact the ends of the second springs SP2. The driven member 16 has the inner spring contact portions 16ci that contact the ends of the first springs SP1, and the outer spring contact portions 16co that contact the ends of the fourth springs SP4. The second, third, and fourth springs SP2, SP3, SP4 in the second torque transmission path P2 can thus be placed outside the first springs SP1 in the first torque transmission path P1 in the radial direction of the damper device 10.

In the above embodiment, the drive member 11 includes: the first plate member 111 that has the spring contact portions 111c contacting the ends of the second springs SP2 and that is coupled to the lockup piston 80 to which power from the engine is transmitted; the second plate member 112 that has the spring contact portions 112c contacting the ends of the first springs SP1 and that is coupled to the first plate member 111 at a position between the first springs SP1 and the second, third, and fourth springs SP2, SP3, SP4 in the radial direction so as to rotate with the first plate member 111; and the third plate member 113 that has the spring contact portions 113c contacting the ends of the first springs SP1 and that is coupled to the second plate member 112 so as to rotate therewith. In addition, the driven member 16 is placed between the second plate member 112 and the third plate member 113 in the axial direction of the damper device 10. This allows the second to fourth springs SP2, SP3, SP4 to be placed outside the first springs SP1 in the radial direction of the damper device 10 while restraining an increase in axial length of the damper device 10.

As shown in FIG. 2, the joint portion between the lockup piston 80 and the first plate member 111 (the rivets fastening the lockup piston 80 and the first plate member 111 together) and the joint portion between the second plate member 112 and the third plate member 113 (the rivets fastening the second plate member 112 and the third plate member 113 together) are located between the first springs SP1 and the second, third, and fourth springs SP2, SP3, SP4 in the radial direction. This can further reduce the axial length of the damper device 10. As shown in FIG. 2, in the damper device 10, the fixed port on between the turbine coupling member 55 and the turbine runner 5 (welds fastening the turbine coupling member 55 and the turbine runner 5, together) is also located between the first springs SP1 and the second, third, and fourth springs SP2, SP3, SP4 in the radial direction. This allows the first intermediate member 12 and the turbine runner 5 to be coupled together while further reducing the axial length of the damper device 10.

In the damper device 10, the first intermediate member 12 is rotatably supported by the tubular portion 111b, or the first support portion, of the first plate member 111 of the drive member 11, and the second intermediate member 14 is rotatably supported by the support portion 113s, or the second support portion, of the third plate member 113 of the drive member 11. The first intermediate member 12 and the second intermediate member 14 are placed outside the part of the first springs SP1 in the radial direction of the damper device 10 so as to be located near the outer periphery of the damper device 10. This can further increase the moments of inertia (inertia) of the first and second intermediate members 12, 14.

Figure 4:
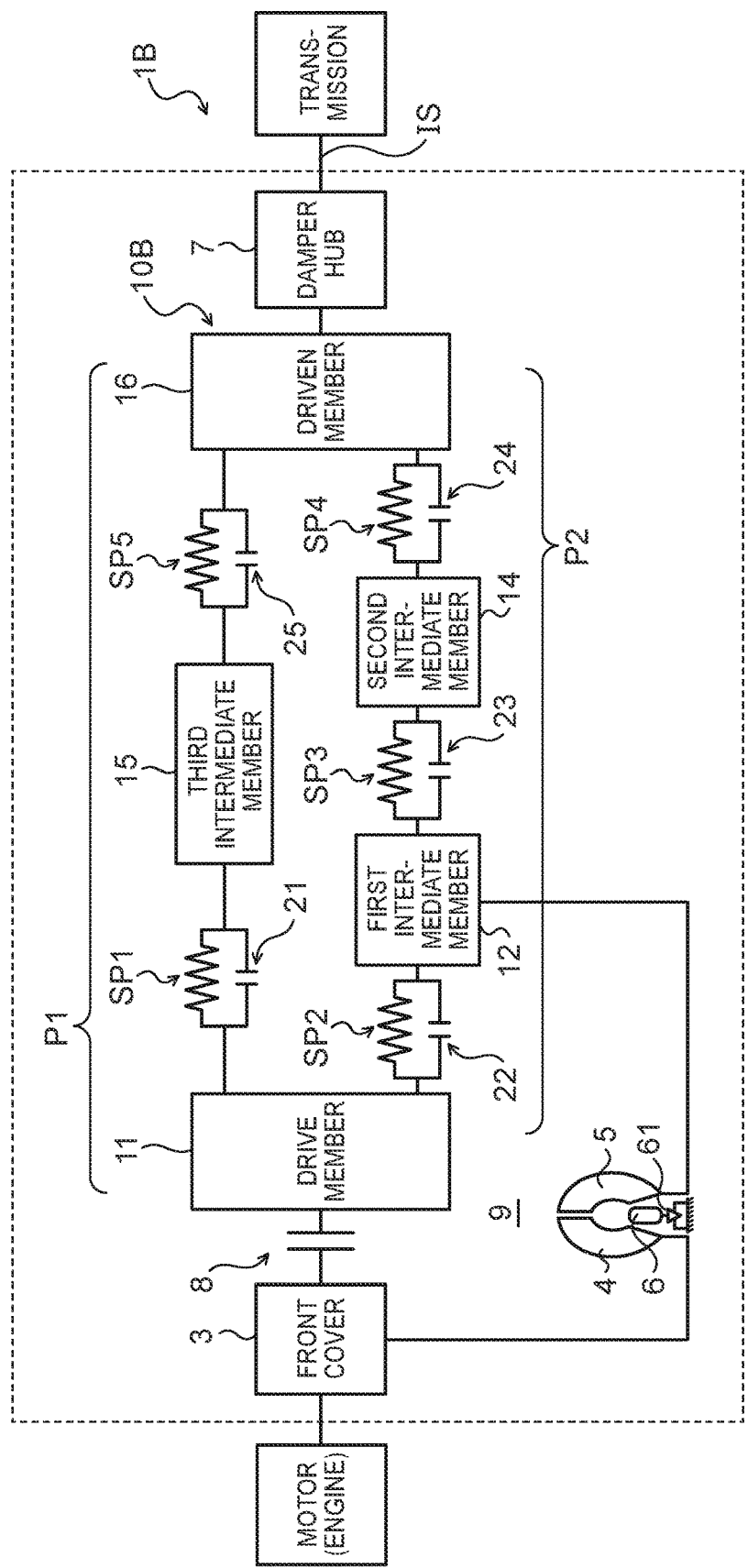
FIG. 4 is a schematic configuration diagram showing a starting device according to another embodiment of the present disclosure.

FIG. 4 is a sectional view showing a starting device 1B including a damper device 10B according to another embodiment of the present disclosure. Of the components of the starting device 1B and the damper device 10B, the same components as those of the starting device 1 and the damper device 10 are denoted with the same reference characters, and description will not be repeated.

As shown in FIG. 4, the damper device 10B of the starting device 1B further includes, in addition to the drive member 11, the first and second intermediate members 12, 14, the driven member 16, and the first to fourth springs SP1 to SP4, a third intermediate member 15 on the first torque transmission path P1 and a plurality of fifth springs (fifth elastic bodies) SP5 that transmit torque between the third intermediate member 15 and the driven member 16. That is, the first torque transmission path P1 of the damper device 10B includes, as elements placed between the drive member 11 and the driven member 16, the third intermediate member 15 and the first and fifth springs SP1, SP5, and transmits torque between the drive member 11 and the driven member 16 via the plurality of first springs SP1, the third intermediate member 15, and the plurality of fifth springs SP5. The damper device 10B further includes a fifth stopper 25 that restricts relative rotation between the third intermediate member 15 and the driven member 16 to restrict deflection of the fifth springs SP5.

In the damper device 10B configured as described above, as in the damper device 10, the two anti-resonance points A1, A2 can be set at which the vibration amplitude of the driven member 16 becomes theoretically zero as vibration transmitted to the driven member 16 through the first torque transmission path P1 and vibration transmitted to the driven member 16 through the second torque transmission path P2 cancel each other when the engine speed increases with the lockup operation being performed. By setting the first anti-resonance point A1 (frequency $fa_1$) on the lower engine speed side (lower frequency side) in a manner similar to that of the damper device 10, the first resonance point R1 that produces the first anti-resonance point A1 can be shifted to the lower engine speed side (the lower frequency side) so as to be included in the non-lockup region. This allows the lockup operation to be performed at a lower engine speed, and can further improve the vibration damping capability of the damper device 10B in the low engine speed range. Moreover, occurrence of resonance of the input shaft IS etc. can be satisfactorily restrained by making the second anti-resonance point A2 (frequency $fa_2$) on the higher engine speed side (higher frequency side) than the first anti-resonance point A1 and the second resonance point R2 equal to (closer to), e.g., (the frequency of the resonance point of the input shaft IS of the transmission etc. Moreover, the overall rigidity of the damper device 10B can be increased (the stroke thereof can be increased) by providing the third intermediate member 15 on the first torque transmission path P1 and causing the first springs SP1 and the fifth springs SP5 to operate in series as in the damper device 10B.

Figure 5:
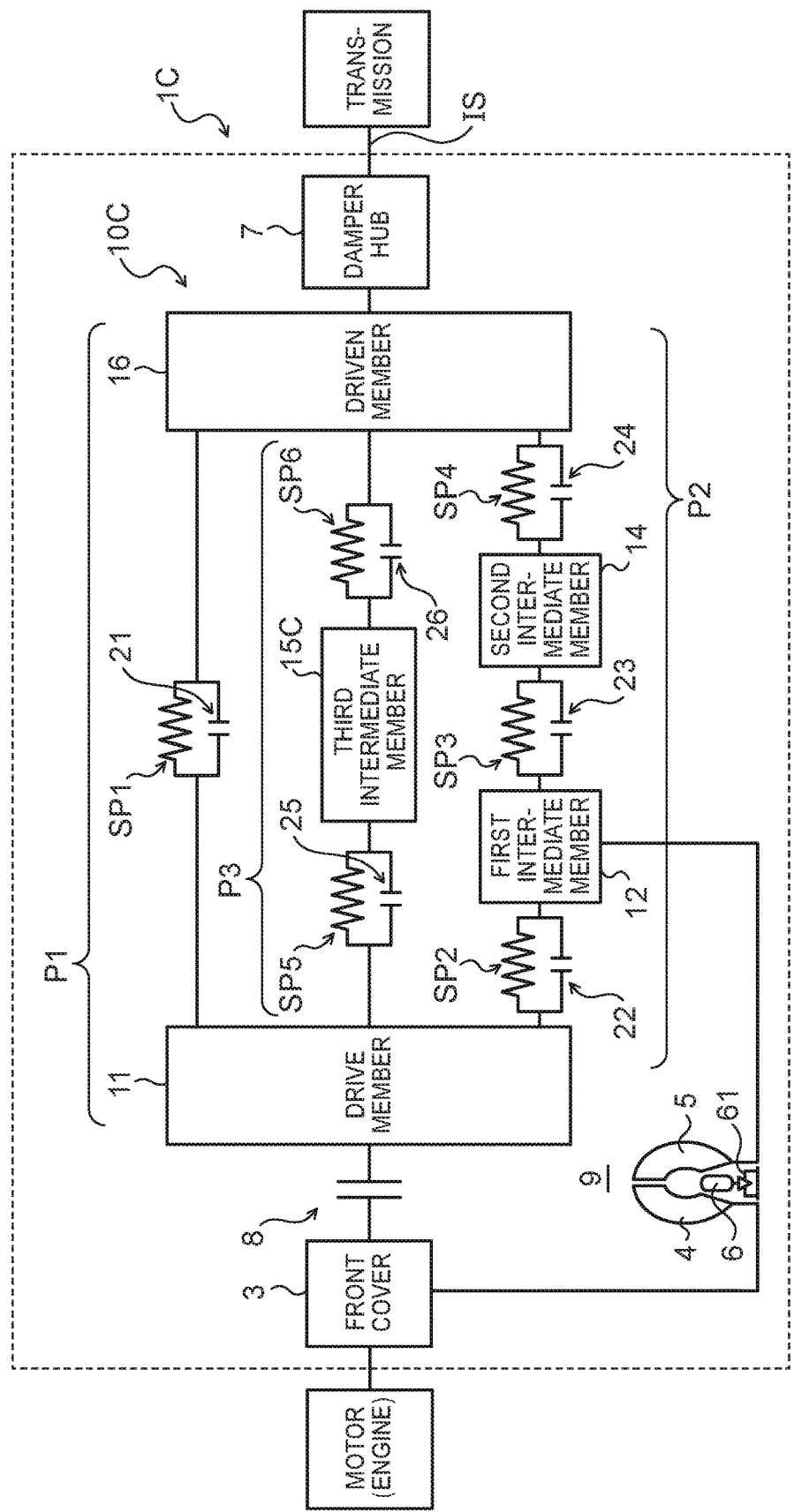
FIG. 5 is a schematic configuration diagram showing a starting device according to still another embodiment of the present disclosure.

FIG. 5 is a sectional view showing a starting device 1C including a damper device 10C according to still another embodiment of the present disclosure. Of the components of the starting device 1C and the damper device 10C, the same components as those of the starting device 1 and the damper device 10 are denoted with the same reference characters, and description will not be repeated.

As shown in FIG. 5, the damper device 10C of the starting device 1C further has a third torque transmission path P3 including a plurality of fifth springs SP5, third intermediate member 15C, and a plurality of sixth springs SP6, in addition to the first torque transmission path P1 including the first springs SP1 and the second torque transmission path P2 including the first and second intermediate members 12, 14 and the second, third, and fourth springs SP2, SP3, SP4. The third torque transmission path P3 transmits torque between the drive member 11 and the driven member 16 via the plurality of fifth springs SP5, the third intermediate member 15C, and the plurality of sixth springs SP6. The damper device 10C further includes a fifth stopper 25 that restricts relative rotation between the drive member 11 and the third intermediate member 15C to restrict deflection of the fifth springs SP5, and a sixth stopper 26 that restricts relative rotation between the third intermediate member 15C and the driven member 16 to restrict deflection of the sixth springs SP6.

Figure 6:
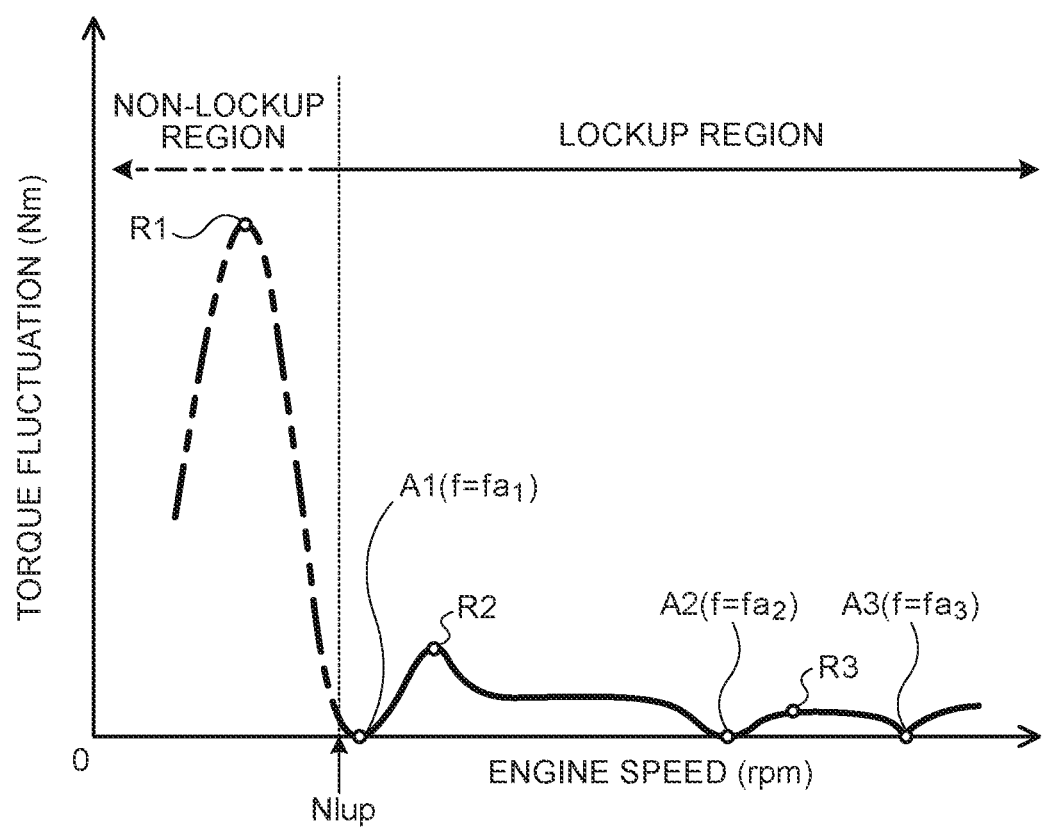
FIG. 6 is an illustration showing the relationship between the engine speed and the torque fluctuation in an output element of a damper device shown in FIG. 5.

In the damper device 10C configured as described above, as the engine speed increases with the lockup operation being performed, the phase of vibration transmitted to the driven member 16 through the first torque transmission path P1 and the phase of vibration transmitted to the driven member 16 through the second torque transmission path P2 are inverted three times, so that three anti-resonance points A1, A2, A3 can be set as shown in FIG. 6. That is, as shown in FIG. 6, in the damper device 10C, the subsequent resonance (e.g., resonance mainly due to vibration of the third intermediate member 15C, see the resonance point R2 in FIG. 6) occurs as the engine speed increases after the anti-resonance point A1 is produced. The second anti resonance point A2 is thus produced as this resonance occurs. Moreover, the subsequent resonance (e.g., resonance mainly due to the first and second intermediate members 12, 14 vibrating in opposite phases from each other, see the resonance point R3 in FIG. 6) occurs as the engine speed increases after the anti-resonance point A2 is produced. The third anti-resonance point A3 is thus produced as this resonance occurs. Accordingly, in the damper device 10C, occurrence of these resonances can be satisfactorily restrained by making the second anti-resonance point A2 (frequency $fa_2$) on the higher engine speed side (higher frequency side than the anti-resonance point A1 equal to (closer to), (the frequency of) the resonance point of the input shaft IS of the transmission, or by making the third anti-resonance point A3 (frequency on the higher engine speed side (higher frequency side) than the anti-resonance point A2 equal to (closer to), e.g., (the frequency of) the resonance point of the drive shaft.

As described above, the damper device of the present disclosure is a damper device (10) including an input element (11) to which power from an internal combustion engine is transmitted and an output element (16). The damper device (10) includes: a first torque transmission path (P1) including a first elastic body (SP1) that transmits torque between the input element (11) and the output element (16); and a second torque transmission path (P2) disposed in parallel with the first torque transmission path (P1) and including first and second intermediate elements (12, 14), a second elastic body (SP2) that transmits the torque between the input element (11) and the first intermediate element (12), a third elastic body (SP3) that transmits the torque between the first intermediate element (12) and the second intermediate element (14), and a fourth elastic body (SP4) that transmits the torque between the second intermediate element (14) and the output element (16).

In this damper device, two resonances (e.g., resonance mainly due to the first and second intermediate elements and the third elastic body vibrating together, and resonance mainly due to the first and second intermediate elements vibrating in opposite phases from each other) occur in the second torque transmission path including the first and second intermediate elements, according to the frequency of vibration transmitted to the input element. Every time such resonances occur, vibration transmitted from the input element to the output element through the first torque transmission path becomes 180 degrees out of phase with respect to that transmitted from the input element to the output element through the second torque transmission path. Accordingly, two anti-resonance points can be set at which vibration is theoretically cancelled at the output element. Vibration damping capability of the damper device having the first and second torque transmission paths disposed in parallel can thus be very satisfactorily improved by making the frequencies at the two anti-resonance points equal to (closer to) the frequency of vibration (resonance) to be damped by the damper device.

The first torque transmission path (P1) may include a plurality of the first elastic bodies (SP1), and the second, third, and fourth elastic bodies (SP2, SP3, SP4) may be placed outside at least a part of the first elastic bodies (SP1) in a radial direction of the damper device (10) so as to be arranged side by side in a circumferential direction of the damper device (10). Since the second, third, and fourth elastic bodies of the second torque transmission path are thus placed outside at least the part of the first elastic bodies of the first torque transmission path in the radial direction of the damper device, the axial length of the damper device can further be reduced, and the frequency of the resonance that produces the anti-resonance point on the lower engine speed side (lower frequency side) can further be reduced by adjustment of rigidity of the second, third, and fourth elastic bodies and moments of inertia of the first and second intermediate elements.

The first and second intermediate elements (12, 14) may be placed outside at least the part of the first elastic bodies (SP1) in the radial direction of the damper device (10). This can further increase the moments of inertia (inertia) of the first and second intermediate elements and can further reduce the frequency at the anti-resonance point on the lower engine speed side (lower frequency side).

One of the first and second intermediate elements (12, 14) may be coupled to a turbine runner (5) of a hydraulic transmission device so as to rotate therewith. This can further increase a substantial moment of inertia of one of the first and second intermediate elements (the sum of moments of inertia) and can further reduce the frequency at the anti-resonance point on the lower engine speed side (lower frequency side).

The first elastic body (SP1) may have a smaller spring constant than the second, third, and fourth elastic bodies (SP2, SP3, SP4). This can further reduce the overall rigidity of the damper device and can further increase the torsion angle of the damper device.

The third elastic body (SP3) may have a larger spring constant than the first, second, and fourth elastic bodies (SP2, SP3, SP4). This allows the first and second intermediate elements and the third elastic body to resonate together at a lower engine speed than the anti-resonance point on the lowest engine speed side (lowest frequency side), so that this anti-resonance point can be set at a lower engine speed.

The first to fourth elastic bodies (SP1, SP2, SP3, SP4) may be coil springs, and the first elastic body (SP1) may have a larger outside diameter than the second, third, and fourth elastic bodies (SP2, SP3, SP4). Since the first elastic body placed closer to the inner periphery has a larger outside diameter, the torsion angle of the first elastic body can be about the same as that of the second, third, and fourth elastic bodies placed closer to the outer periphery. Moreover, torque can be satisfactorily allocated to the first torque transmission path by making the wire diameter of the first elastic body larger than that of the second, third, and fourth elastic bodies.

The input element (11) may have an inner contact portion (112c, 113c) contacting an end of the first elastic body (SP1), and an outer contact portion (111c) contacting an end of the second elastic body (SP2), and the output element (16) may have an inner contact portion (16ci) contacting the end of the first elastic body (SP1), and an outer contact portion (16co) contacting an end of the fourth elastic body (SP4). This allows the second, third, and fourth elastic bodies of the second torque transmission path to be placed outside the first elastic body of the first torque transmission path in the radial direction of the damper device.

The input element (11) may include a first input member (111) that has the outer contact portion (111c) contacting the end of the second elastic body (SP2) and that is coupled to a power input member (80) to which the power from the internal combustion engine is transmitted, a second input member (112) that has the inner contact portion (112c) contacting the end of the first elastic body (SP1) and that is coupled to the first input member (111) at a position between the first elastic body (SP1) and the second, third, and fourth elastic bodies (SP2, SP3, SP4) in the radial direction so as to rotate with the first input member (111), and a third input member (113) that has the inner contact portion (113c) contacting the end of the first elastic body (SP1) and that is coupled to the second input member (112) so as to rotate therewith. The output element (16) may be placed between the second input member (112) and the third input member (113) in an axial direction of the damper device (10). This allows the second and third elastic bodies to be placed outside the first elastic body in the radial direction of the damper device while restraining an increase in axial length of the damper device.

A joint portion between the power input member (80) and the first input member (111) and a joint portion between the second input member (112) and the third input member (113) may be located between the first elastic body (SP1) and the second, third, and fourth elastic bodies (SP2, SP3, SP4) in the radial direction. This can further reduce the axial length of the damper device.

The damper device (10) may further include: a turbine coupling member (55) that is fixed to the turbine runner (5) of the hydraulic transmission device and that couples the first or second intermediate element (12, 14) and the turbine runner (5) so that the first or second intermediate element (12, 14) and the turbine runner (5) rotate together. A fixed portion between the turbine coupling member (55) and the turbine runner (5) may be located between the first elastic body (SP1) and the second, third, and fourth elastic bodies (SP2, SP3, SP4) in the radial direction. This alloys the second intermediate element and the turbine runner to be coupled together while further reducing the axial length of the damper device.

The first intermediate element (12) may be rotatably supported by a first support portion (111b) of the input element (11, 111), and the second intermediate element (14) may be rotatably supported by a second support portion (113s) of the input element (11, 113).

The spring constants of the first, second, third, and fourth elastic bodies (SP1, SP2, SP3, SP4) and moments of inertia ($J_{21}$, $J_{22}$) of the first and second intermediate elements (12, 14) may be determined based on a lowest one ($fa_1$) of frequencies at anti-resonance points (A) at which a vibration amplitude of the output element (16) is theoretically zero. This can further improve the vibration damping capability of the damper device in a low engine speed range where vibration from the internal combustion engine tends to be large.

The spring constants of the first, second, third, and fourth elastic bodies (SP1, SP2, SP3, SP4) and the moments of inertia ($J_{21}$, $J_{22}$) of the first and second intermediate elements (12, 14) may be determined based on the lowest frequency ($fa_1$) at the anti-resonance point (A) and the number (n) of cylinders of the internal combustion engine. This allows vibration transmitted from the internal combustion engine to the input element to be more satisfactorily damped.

The damper device (10) may be configured so as to satisfy 500 rpm$\leq$(120/n)·$fa_1\leq$1,500 rpm, where "$fa_1$" represents the lowest frequency at the anti-resonance point (A) and "n" represents the number of cylinders of the internal combustion engine.

In the case where the anti-resonance point on the lowest engine speed side (lowest frequency side) out of the anti-resonance points at which the vibration amplitude of the output element can further be reduced is set in the low engine speed range of 500 rpm to 1,500 rpm, the internal combustion engine and the input element are allowed to be coupled together at a lower engine speed, and the damper device can have further improved vibration damping capability in the low engine speed range in which vibration from the internal combustion engine tends to be large. Moreover, in the case where the damper device is configured so that the frequency of the resonance that produces the anti-resonance point on the lowest engine speed side (the resonance that ha to be caused in order to form this anti-resonance point) is lower than the lowest frequency $fa_1$ and is as low as possible, the lowest frequency $fa_1$ can further be reduced, and the internal combustion engine and the input element are allowed to be coupled together at a much lower engine speed. Moreover, the vibration damping capability can be very satisfactorily improved by making the frequency of the anti-resonance point on a higher engine speed side (higher frequency side) than the anti resonance point on the lowest engine speed side equal to (closer to) the frequency of other vibration (resonance) to be damped by the damper device.

The damper device (10) may be configured so as to satisfy Nlup$\leq$(120/n)·$fa_1$, where "$fa_1$" represents the lowest frequency at the anti-resonance point and "Nlup" represents a lockup engine speed of a lockup clutch (8) that couples the internal combustion engine to the input element (11). This allows vibration thorn the internal combustion engine to be very satisfactorily damped by the damper device when and immediately after the internal combustion engine is coupled to the input element by the lockup clutch.

The damper device (10) may be configured so as to satisfy 900 rpm$\leq$(120/n)·$fa_1\leq$1200 rpm.

The lowest frequency $fa_1$ at the anti-resonance point (A) may be given by the above expression (11).

The first torque transmission path (P1) may further include a third intermediate element (15) and a fifth elastic body (SP5). The first elastic body (SP1) may transmit the torque between the input element (and the third intermediate element (15), and the fifth elastic body (SP5) may transmit the torque between the third intermediate element (15) and the output element (16). In the damper device configured as described above as well, two anti-resonance points can be set at which the vibration amplitude of the output element becomes theoretically zero as vibrations transmitted to the output element through the first and second torque transmission paths cancel each other.

The damper device may further include: a third torque transmission path (P3) disposed in parallel with the first and second torque transmission paths (P1, P2). The third torque transmission path (P3) may include a third intermediate element (15C), fifth elastic body (SP5) that transmits the torque between the input element (11) and the third intermediate element (15C), and a sixth elastic body (SP6) that transmits the torque between the third intermediate element (15C) and the output element (16). In the damper device configured as described above, three anti-resonance points can be set at which the vibration amplitude of the output element becomes theoretically zero as vibrations transmitted to the output element through the first, second, and third torque transmission paths cancel each other.

The damper device (10, 10B, 10C) may be configured so that deflection of the first to fourth elastic bodies (SP1, SP2, SP3, SP4) is not restricted until input torque (T) transmitted from the internal combustion engine to the input element (11) becomes equal to or larger than a predetermined threshold (T1).

It should be understood that the disclosure of the present disclosure is not limited in any way to the above embodiments, and various modifications can be made without departing from the spirit and scope of the present disclosure. The above modes for carrying out the disclosure are merely shown as specific forms of the disclosure described in "SUMMARY" and are not intended to limit the elements of the disclosure described in "SUMMARY."

INDUSTRIAL APPLICABILITY

The disclosure of the present disclosure is applicable to manufacturing fields of damper devices etc.

The invention claimed is:

1. A damper device including an input element to which power from an internal combustion engine is transmitted and an output element, the damper device comprising:
    a first torque transmission path including a first elastic body that transmits torque between the input element and the output element; and
    a second torque transmission path disposed in parallel with the first torque transmission path and including first and second intermediate elements, a second elastic body that transmits the torque between the input element and the first intermediate element, a third elastic body that transmits the torque between the first intermediate element and the second intermediate element, and a fourth elastic body that transmits the torque between the second intermediate element and the output element,
    wherein a phase of vibration transmitted from the input element to the output element via the first torque transmission path is an opposite phase to a phase of a vibration transmitted from the input element to the output element via the second torque transmission path.

2. The damper device according to claim 1, wherein
the first torque transmission path includes a plurality of the first elastic bodies, and
the second, third, and fourth elastic bodies are placed outside at least a part of the first elastic bodies in a radial direction of the damper device so as to be arranged side by side in a circumferential direction of the damper device.

3. The damper device according to claim 2, wherein
the first and second intermediate elements are placed outside at least the part of the first elastic bodies in the radial direction of the damper device.

4. The damper device according to claim 1, wherein
one of the first and second intermediate elements is coupled to a turbine runner of a hydraulic transmission device so as to rotate therewith.

5. The damper device according to claim 1, wherein
the first elastic body has a smaller spring constant than the second, third, and fourth elastic bodies.

6. The damper device according to claim 1, wherein
the third elastic body has a larger spring constant than the first, second, and fourth elastic bodies.

7. The damper device according to claim 1, wherein
the first to fourth elastic bodies are coil springs, and
the first elastic body has a larger outside diameter than the second, third, and fourth elastic bodies.

8. The damper device according to claim 7, wherein
the input element has an inner contact portion contacting an end of the first elastic body, and an outer contact portion contacting an end of the second elastic body, and
the output element has an inner contact portion contacting the end of the first elastic body, and an outer contact portion contacting an end of the fourth elastic body.

9. The damper device according to claim 8, wherein
the input element includes a first input member that has the outer contact portion contacting the end of the second elastic body and that is coupled to a power input member to which the power from the internal combustion engine is transmitted, a second input member that has the inner contact portion contacting the end of the first elastic body and that is coupled to the first input member at a position between the first elastic body and the second, third, and fourth elastic bodies in a radial direction so as to rotate with the first input member, and a third input member that has the inner contact portion contacting the end of the first elastic body and that is coupled to the second input member so as to rotate therewith, and
the output element is placed between the second input member and the third input member in an axial direction of the damper device.

10. The damper device according to claim 9, wherein
a joint portion between the power input member and the first input member and a joint portion between the second input member and the third input member are located between the first elastic body and the second, third, and fourth elastic bodies in the radial direction.

11. The damper device according to claim 10, further comprising:
a turbine coupling member that is fixed to a turbine runner of a hydraulic transmission device and that couples the first or second intermediate element and the turbine runner so that the first or second intermediate element and the turbine runner rotate together, wherein a fixed portion between the turbine coupling member and the turbine runner is located between the first elastic body and the second, third, and fourth elastic bodies in the radial direction.

12. The damper device according to claim 1, wherein
the first intermediate element is rotatably supported by a first support portion of the input element, and the second intermediate element is rotatably supported by a second support portion of the input element.

13. The damper device according to claim 1, wherein
spring constants of the first, second, third, and fourth elastic bodies and moments of inertia of the first and second intermediate elements are determined based on a lowest one of frequencies at anti-resonance points at which a vibration amplitude of the output element is theoretically zero.

14. The damper device according to claim 13, wherein
the spring constants of the first, second, third, and fourth elastic bodies and the moments of inertia of the first and second intermediate elements are determined based on the lowest frequency at the anti-resonance point and the number of cylinders of the internal combustion engine.

15. The damper device according to claim 13, wherein
the damper device is configured so as to satisfy 500 rpm≤(120/n)·$fa_1$≤1,500 rpm, where "$fa_1$" represents the lowest frequency at the anti-resonance point and "n" represents the number of cylinders of the internal combustion engine.

16. The damper device according to claim 13, wherein
the damper device is configured so as to satisfy Nlup= (120/n)·$fa_1$, where "$fa_1$" represents the lowest frequency at the anti-resonance point and "Nlup" represents a lockup engine speed of a lockup clutch that couples the internal combustion engine to the input element.

17. The damper device according to claim 13, wherein
the damper device is configured so as to satisfy Nlup< (120/n)·$fa_1$, where "$fa_1$" represents the lowest frequency at the anti-resonance point and "Nlup" represents a lockup engine speed of a lockup clutch that couples the internal combustion engine to the input element.

18. The damper device according to claim 13, wherein
the damper device is configured so as to satisfy 900 rpm≤(120/n)·$fa_1$≤1,200 rpm, where "$fa_1$" represents the lowest frequency at the anti-resonance point and "n" represents the number of cylinders of the internal combustion engine.

19. The damper device according to claim 13, wherein
the lowest frequency $fa_1$ at the anti-resonance point is given by the following expression (1) where "a" is as given by the following expression (2), "b" is as given by the following expression (3), "c" is as given by the following expression (4), "$k_1$" represents the spring constant of the first elastic body, "$k_2$" represents the spring constant of the second elastic body, "$k_3$" represents the spring constant of the third elastic body, "$k_4$" represents the spring constant of the fourth elastic body, "$J_{21}$" represents the moment of inertia of the first intermediate element, and "$J_{22}$" represents the moment of inertia of the second intermediate element $$fa_1 = \frac{1}{2\pi}\sqrt{\frac{b - \sqrt{b^2 - 4ac}}{2a}} \qquad (1)$$

-continued $$a = J_{21}J_{22}k_1 \quad (2)$$

$$b = \{J_{21}k_4 + (J_{21} + J_{22})k_3 + J_{22}k_2\}k_1 \quad (3)$$

$$c = k_1k_2k_3 + k_2k_3k_4 + k_3k_4k_1 + k_4k_1k_2. \quad (4)$$

20. The damper device according to claim 1, wherein deflection of the first to fourth elastic bodies is not restricted until input torque transmitted from the internal combustion engine to the input element becomes equal to or larger than a predetermined threshold.

* * * * *